United States Patent [19]

Gautier et al.

[11] Patent Number: 5,193,434
[45] Date of Patent: Mar. 16, 1993

[54] ACTUATING DEVICE FOR A MASTER CYLINDER

[75] Inventors: Jean-Pierre Gautier, Aulnay-sous-Bois; Miguel Perez, Argenteuil; Ulysse Verbo, Aulnay-Sous-Bois, all of France

[73] Assignee: Bendix Europe Services Techniques, Drancy, France

[21] Appl. No.: 782,221

[22] Filed: Oct. 25, 1991

[30] Foreign Application Priority Data

Nov. 13, 1990 [FR] France ................................. 90 14063

[51] Int. Cl.$^5$ ............................................. F01B 9/00
[52] U.S. Cl. ........................................ 92/140; 60/547.1; 403/326
[58] Field of Search .................... 60/594, 547.1, 593; 92/84, 109, 113, 114, 140; 403/361, 326; 74/110

[56] References Cited

U.S. PATENT DOCUMENTS

| | | | |
|---|---|---|---|
| 2,124,762 | 7/1938 | Carroll | 188/152 |
| 3,010,772 | 11/1961 | Kellogg et al. | |
| 3,016,880 | 1/1962 | Kellogg et al. | 60/547.1 |
| 3,026,852 | 3/1962 | Stelzer | 60/547.1 |
| 4,411,314 | 10/1983 | Shearhart | 403/326 |
| 4,854,764 | 8/1989 | Faber et al. | 403/326 |

*Primary Examiner*—Edward K. Look
*Assistant Examiner*—F. Daniel Lopez
*Attorney, Agent, or Firm*—Larry J. Palguta; Ken C. Decker

[57] ABSTRACT

The actuating device for a master cylinder is constituted by an actating rod (10) acting on a piston (12) of the master cylinder. Elastic centering mechanism (26) are arranged between the actuating rod (10) of the master cylinder and the piston (12) of the master cylinder, and are compressed therebetween.

6 Claims, 1 Drawing Sheet

ACTUATING DEVICE FOR A MASTER CYLINDER

BACKGROUND OF THE INVENTION

The subject of the present invention is an actuating device for a master cylinder, especially intended to equip a braking circuit of a motor vehicle.

It is known that such master cylinders comprise at least one piston whose actuation induces an increase in the pressure of a hydraulic fluid in at least one working chamber, this increase in pressure being transmitted by pipes to brake motors in order to immobilize the wheels of the vehicle so equipped. The actuation of the piston of the master cylinder takes place, in a known manner, either by a rod directly attached to the brake pedal, or by the pushrod of a pneumatic brake booster which can itself be actuated by the brake pedal.

It may happen that, in certain situations, although numerous precautions are taken, the actuating rod of the master cylinder piston loses contact with the latter. These cases may for example occur when various springs providing a return to the rest position are fatigued, when the manufacturing tolerances accumulate and introduce large play, or when vibrations occur in the braking circuit. The latter possibility may, for example, originate from the interposition in the braking circuit of an anti-lock device for the wheels which, during its periods of operation, modulates the pressure in the braking circuit at a high rate. Thus, vibrations occur at the interface between the piston of the master cylinder and the actuating rod, which vibrations generate noise and are capable of inducing rotation of the actuating rod, the loss of adjustments carried out on this and premature wear of the components.

The subject of the invention is, therefore, an actuating device for a master cylinder for the braking circuit of a motor vehicle, which provides the centering of the actuating rod with respect to the piston of the master cylinder, which prevents their relative rotation, which avoids vibrations and noise between these two components, and which limits their wear.

Document US-A-3 010 772 discloses the use of a resilient retainer means forbidding an axial relative movement of the rod with respect of the piston of the master cylinder. However this retainer means does not act for radially maintaining the rod with respect of the piston.

SUMMARY OF THE INVENTION

With this aim, the invention provides an actuating device for a master cylinder constituted by an actuating rod acting on a piston of a master cylinder.

According to a feature of the invention, elastic centering means are provided between the actuating rod of the master cylinder and the piston of the master cylinder, and are compressed therebetween.

According to an advantageous feature of the invention, these elastic means are constituted by a ring of resilient material placed about the actuating rod and inside a housing of the piston of the master cylinder.

Also in an advantageous manner, this ring may possess grooves on one of its faces.

BRIEF DESCRIPTION OF THE DRAWINGS

The invention will now be described by way of example with reference to the accompanying drawings in which.

DETAILED DESCRIPTION OF THE INVENTION

Figure 1:
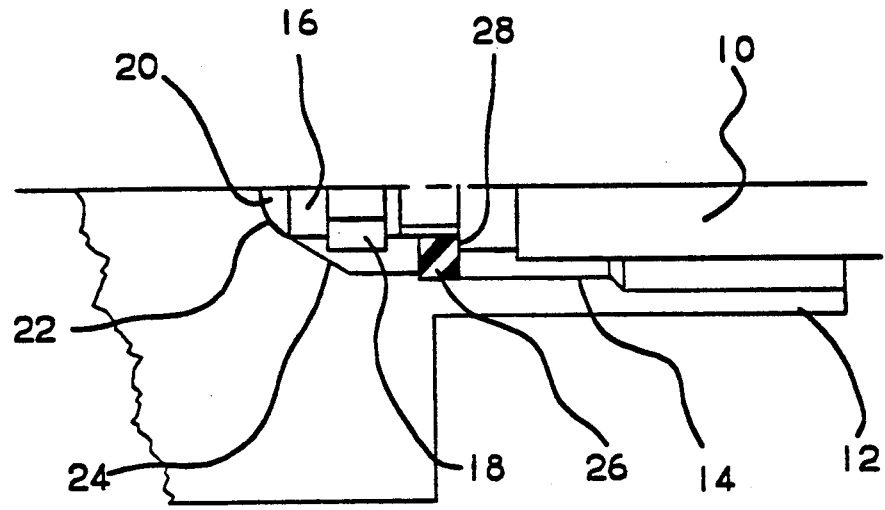
FIG. 1 shows in half-section an actuating device of a master cylinder embodied according to the present invention.

In FIG. 1 an actuating device for a master cylinder is shown, constituted by an actuating rod 10 cooperating with the piston 12 of the master cylinder (not shown) by penetrating into a housing provided in the piston 12 in its part facing the exterior of the master cylinder.

The actuating rod 10 is provided, at its end cooperating with the piston 12, with a screw 16 of which a part of the end possesses means 18 for locking in rotation the screw, for example in the form of a hexagon nut. The screw 16 serves, in a known manner, for adjusting the length of the rod 10 to the desired value, the locknut 18 locking it in the required position. The screw 16 is provided with a head in the form of a spherical cap 20, the bottom of the housing 14 possessing a spherical bowl form 22 having the same radius of curvature, the edges of this spherical bowl being connected to the walls of the housing 14 via a wall portion 24 having a frustoconical shape.

It can thus be clearly seen that, either through loss of stiffness of one of the return springs (not shown) of the actuating system or through manufacturing tolerances, the cap 20 may lose contact with the bowl 22. Thus, excessive return travel or lost motion follows. In addition, if the braking system is equipped with an anti-lock device for the wheels or a device for preventing wheel spin under acceleration, the operation of such devices may induce vibrations in the braking circuit that may reverberate on the piston 12 of the master cylinder.

During these vibrations of the piston 12, the cap 20 will also be periodically induced to lose contact with the bowl 22. The cap 20 will then periodically foul on the portion of wall 24. Thus, as mentioned above, undesirable noise, premature wear of the cap 20, the bowl 22 and the portion of wall 24, a decentering of the shaft 10 in the housing 14 and a loosening of the screw 16 result.

These disadvantages are avoided by virtue of the invention which provides for arranging centering elastic means 26 between the actuating rod 10 and the piston 12 between which they are compressed. These elastic means are, in the example shown, constituted by an elastic ring 26 arranged between the wall of the housing 14 and the rod 10. As can be easily understood, the ring 26, made from resilient material, such as for example rubber, provides the axial and radial retention of the rod 10 with respect to the piston 12. The radial retention of the rod 10 with respect to the piston 12 is obtained by the radial compression of the ring 26, the axial retention of these two parts, advantageously being able to be improved by the provision, for example, of a shoulder 28 on the rod 10 acting as a support for the ring 26. A support shoulder may also be provided in the wall of the housing 14. Two shoulders may also be provided on the rod 10 in order to form a groove in this rod to receive the ring 26. In an alternative or additional manner two shoulders delimiting a groove may be formed in the wall of the housing 14 to receive the ring 26.

Although any shape of ring may, a priori, be suitable, for example a toroidal ring, it has been found that a ring whose axial section, that is to say in a plane containing its axis, offers a polygonal cross-section gives the best results, in particular a rectangular cross-section, and even more advantageously a square cross-section such as is shown in FIG. 1.

Figure 2:
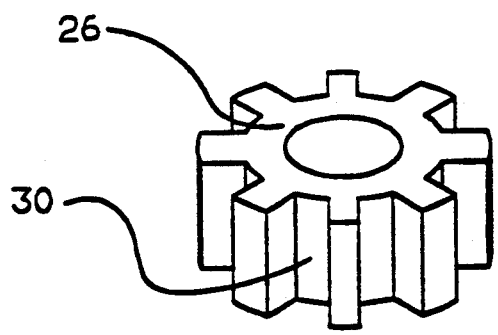
FIG. 2 is a perspective view of an embodiment of a ring implementing the present invention.
Figure 3:
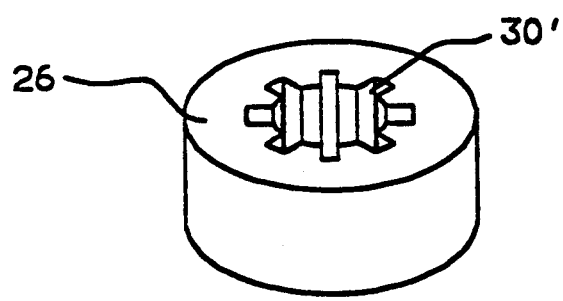
FIG. 3 is a perspective view of a variation of the embodiment of FIG. 2.
Figure 4:
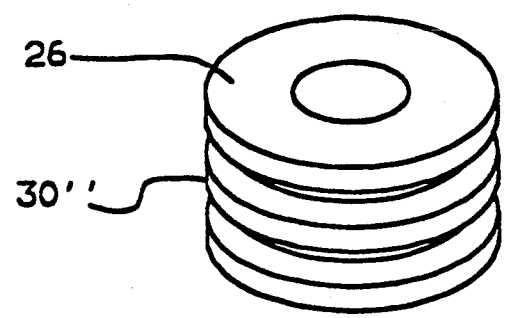
FIG. 4 is a perspective view of another variation of the embodiment of FIG. 2.

In order to augment the elasticity of the ring 26 and to facilitate its assembly both on the rod 10 and in the housing 14, it may advantageously be formed with grooves 30 on its exterior surface as shown in FIG. 2 and/or 30' on its interior surface as in FIG. 3. These grooves may be axial as shown in FIGS. 2 and 3 or contained in a plane perpendicular to the axis of the ring 26, that is to say continuous grooves 30" along the exterior or interior circumference of the ring 26 as shown in FIG. 4.

What we claim is:

1. An actuating device for a master cylinder constituted by an actuating rod acting on a piston of the master cylinder, the actuating rod penetrating into a housing provided in the piston of the master cylinder, the device comprising elastic centering means arranged about the actuating rod and in the interior of the housing of the piston of the master cylinder and compressed therebetween, the elastic means being constituted by a rubber ring presenting a polygonal axial cross-section and grooves formed on at least one of the interior and exterior surfaces of the ring.

2. The device according to claim 1, wherein the rubber ring presents a square axial cross-section.

3. The device according to claim 1, wherein the rubber ring bears on at least one shoulder formed on one of the rod and a wall of the housing.

4. The device according to claim 1, wherein the grooves formed on the rubber ring extend in an axial direction.

5. The device according to claim 1, wherein the grooves formed on the rubber ring are contained in a plane perpendicular to an axis of the rubber ring.

6. The device according to claim 1, wherein the actuating rod of the master cylinder is a pushrod of a pneumatic brake booster.

* * * * *